United States Patent
Liu et al.

(10) Patent No.: US 10,272,404 B2
(45) Date of Patent: *Apr. 30, 2019

(54) NOZZLE FOR PRODUCING MICROPARTICLES

(71) Applicant: METAL INDUSTRIES RESEARCH & DEVELOPMENT CENTRE, Kaohsiung (TW)

(72) Inventors: Zong-Hsin Liu, Kaohsiung (TW); Cheng-Han Hung, Kaohsiung (TW); Ying-Chieh Lin, Kaohsiung (TW); Cheng-Tang Pan, Kaohsiung (TW); Yao-Kun Huang, Kaohsiung (TW); Ying-Cheng Lu, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 148 days.

This patent is subject to a terminal disclaimer.

(21) Appl. No.: 15/378,266

(22) Filed: Dec. 14, 2016

(65) Prior Publication Data

US 2018/0099256 A1 Apr. 12, 2018

(30) Foreign Application Priority Data

Oct. 12, 2016 (TW) .............................. 105132934 A

(51) Int. Cl.
  *B01J 2/04* (2006.01)
  *B01J 2/06* (2006.01)
  *B05B 1/00* (2006.01)
(52) U.S. Cl.
  CPC .. *B01J 2/06* (2013.01); *B05B 1/00* (2013.01)
(58) Field of Classification Search
  CPC .......................................................... B01J 2/06

USPC ....................................................... 425/6–10
See application file for complete search history.

(56) References Cited

U.S. PATENT DOCUMENTS 8,568,628 B2 * 10/2013 Norikane ................... B01J 2/04
  425/10

FOREIGN PATENT DOCUMENTS

CN          104324839 A      2/2015

OTHER PUBLICATIONS

Robert J. Lang, Ultrasonic Atomization of Liquids, The Journal of the Acoustical Society of America, Jan. 1962, 3 pages, vol. 34, No. 1, United States.

* cited by examiner

*Primary Examiner* — Joseph S Del Sole
*Assistant Examiner* — Thu Khanh T Nguyen
(74) *Attorney, Agent, or Firm* — Alan D. Kamrath; Kamrath IP Lawfirm, P.A.

(57) ABSTRACT

A nozzle for producing microparticles includes a nozzle body having a first end and a second end opposite to the first end. The nozzle body further includes a through-hole extending from the first end through the second end. A fluid passageway is defined in the through-hole and forms a filling port in the first end of the nozzle body and a plurality of outlet ports in the second end of the nozzle body. The nozzle body further includes an oscillating device and an amplifying portion. The oscillating device is connected to the amplifying portion. The amplifying portion surrounds the fluid passageway and is located adjacent to the second end of the nozzle body.

5 Claims, 6 Drawing Sheets

NOZZLE FOR PRODUCING MICROPARTICLES

CROSS REFERENCE TO RELATED APPLICATIONS

The application claims the benefit of Taiwan application serial No. 105132934, filed Oct. 12, 2016, the subject matter of which is incorporated herein by reference.

BACKGROUND

1. Technical Field

The present disclosure relates to a nozzle for producing microparticles and, more particularly, to a nozzle for mass production of microparticles.

2. Description of the Related Art

Microparticles, also known as microspheres, are spherical particles having a diameter ranging from 1 μm to 1000 μm, are generally used as microcarriers for releasing drugs, and have become one of the emerging drug delivery technologies due to the characteristics of targeting, controlled release, stability, and surface modifiability.

Since the diameters of microparticles are small, the first aim is to form microparticles of uniform diameters to make each microparticle have the same drug releasing effect. For example, a conventional micro fluid passageway structure 9 shown in FIG. 1 can be used to form microparticles with more uniform diameters.

With reference to FIG. 1, the conventional micro fluid passageway structure 9 includes a Y-shaped passageway 91, a curing agent filling port 92, a material solution filling port 93, and a cruciform micro fluid passageway 94. The Y-shaped passageway 91 is intercommunicated with the cruciform micro fluid passageway 94. A branch of the Y-shaped passageway 91 is intercommunicated with the curing agent filling port 92 through which a curing agent solution is filled. Another branch of the Y-shaped passageway 91 is intercommunicated with the material solution filling port 93 through which a material solution is filled. The curing agent solution and the material solution form a pre-solidified mixed solution at a third end of the Y-shaped passageway 91. The third end of the Y-shaped passageway 91 is intercommunicated with the cruciform micro fluid passageway 94. A water phase solution is filled into two ends of the cruciform micro fluid passageway 94. The shear stress of the water phase solution filled into the cruciform micro fluid passageway 94 makes the pre-solidified mixed solution flowing into the cruciform micro fluid passageway 94 form emulsified spheres separate from each other, and each emulsified sphere finally forms a microparticle.

Although the above conventional micro fluid passageway structure 9 can form microparticles with more uniform diameters, the conventional micro fluid passageway structure 9 cannot easily proceed with mass production. Improvement is, thus, necessary.

SUMMARY

To solve the above problem, the present disclosure provides a nozzle enabling mass production of microparticles.

A nozzle for producing microparticles according to the present disclosure includes a nozzle body having a first end and a second end opposite to the first end. The nozzle body further includes a through-hole extending from the first end through the second end. A fluid passageway is defined in the through-hole and forms a filling port in the first end of the nozzle body and a plurality of outlet ports in the second end of the nozzle body. The nozzle body further includes an oscillating device and an amplifying portion. The oscillating device is connected to the amplifying portion. The amplifying portion surrounds the fluid passageway and is located adjacent to the second end of the nozzle body.

The nozzle for producing microparticles according to the present disclosure utilizes the combined action of the piezoelectric portion and the amplifying portion to reduce the thickness of the liquid film on each outlet port, thereby forming microdroplets that fall into the tank. Thus, the present disclosure achieves the effect of mass production of uniform microscale or nanoscale microparticles.

In an example, each of the plurality of outlet ports has a diameter, with two adjacent outlet ports having a wall spacing therebetween, and the wall spacing is at least two times the diameter. Thus, the liquid films at the second end can more easily absorb the amplitude energy to generate a standing wave phenomenon.

In an example, the nozzle body includes a tube mounted in the through-hole. The filling port is formed in an end of the tube. A sleeve is mounted to the other end of the tube and includes the plurality of outlet ports. The tube includes an interior forming the fluid passageway. Thus, a worker can replace the tube or the sleeve according to the need without replacing the whole nozzle body, thereby reducing the purchasing costs of the nozzle.

The present disclosure will become clearer in light of the following detailed description of illustrative embodiments of the present disclosure described in connection with the drawings.

DETAILED DESCRIPTION

Figure 1:
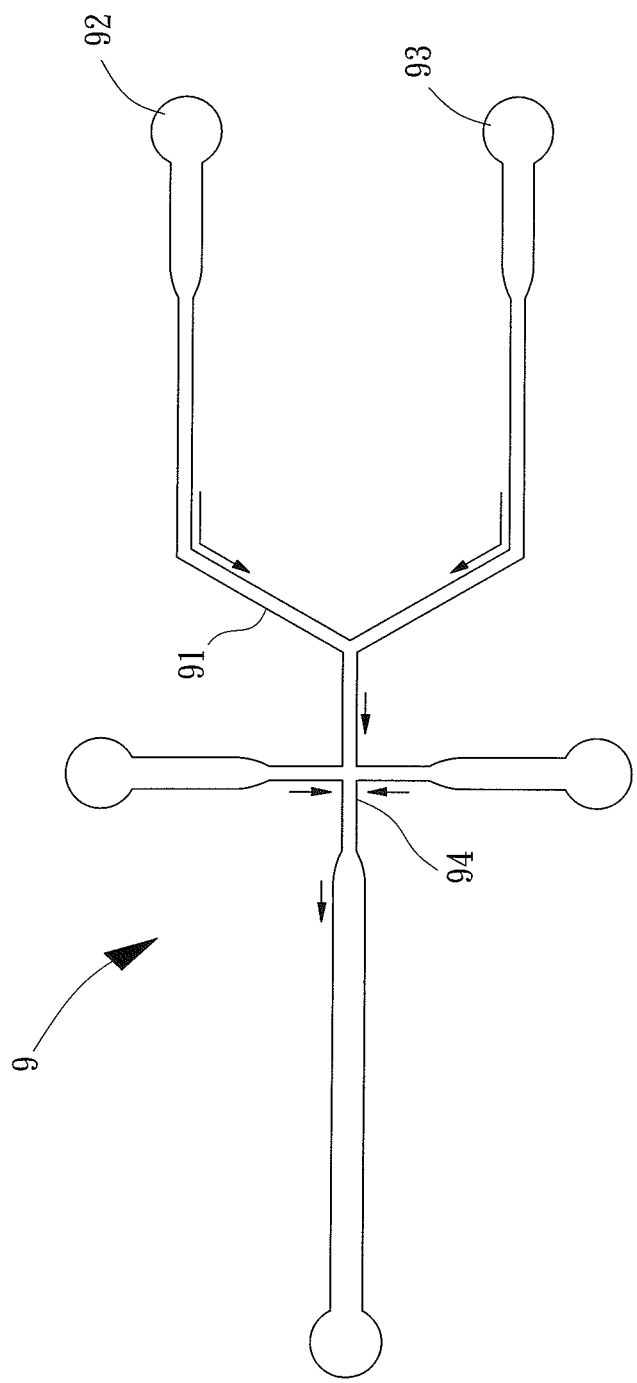
FIG. 1 is a diagrammatic view of a conventional micro fluid passageway structure.
Figure 2:
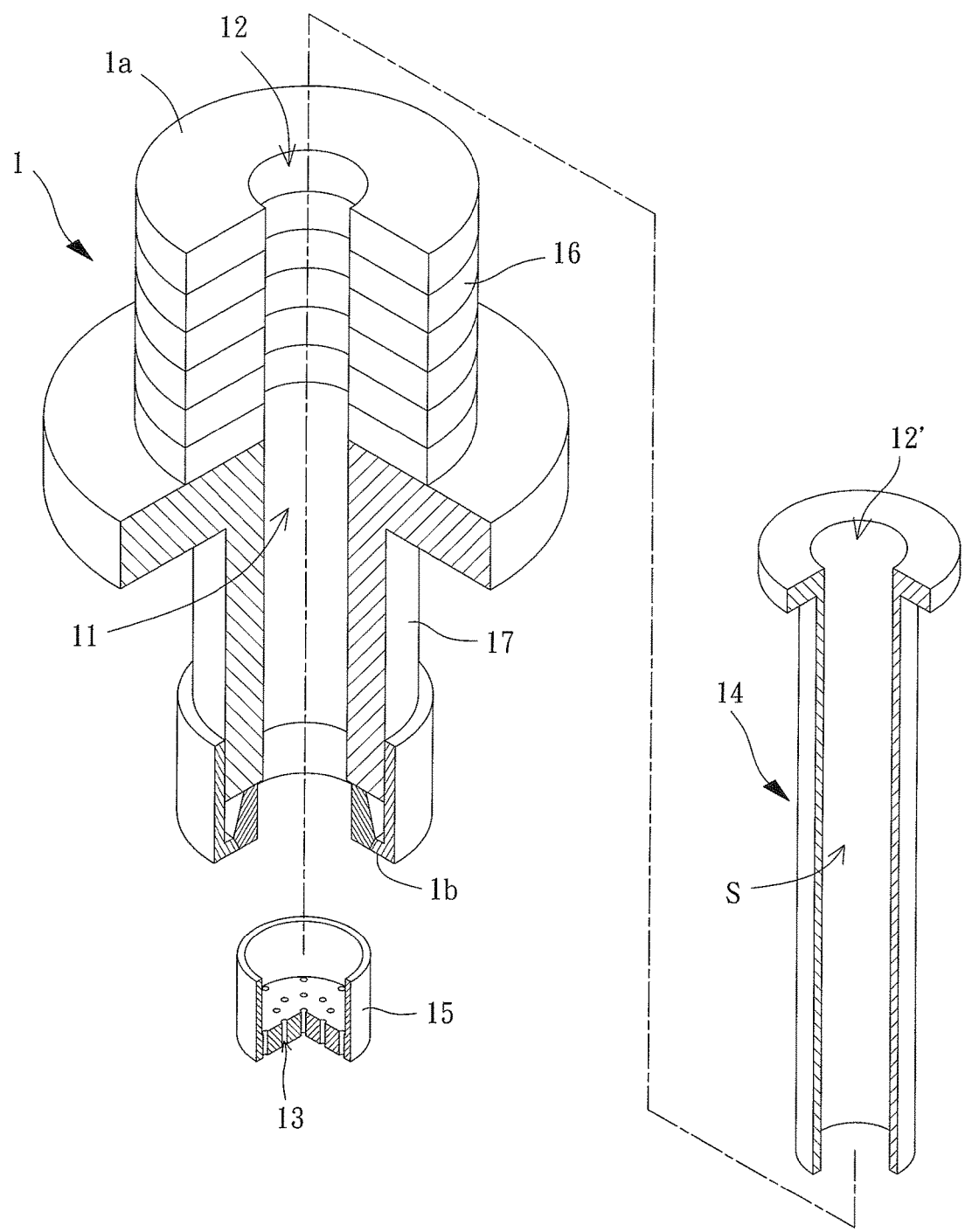
FIG. 2 is an exploded, partly cut-away, perspective view of a nozzle for producing microparticles of an embodiment according to the present disclosure.
Figure 3:
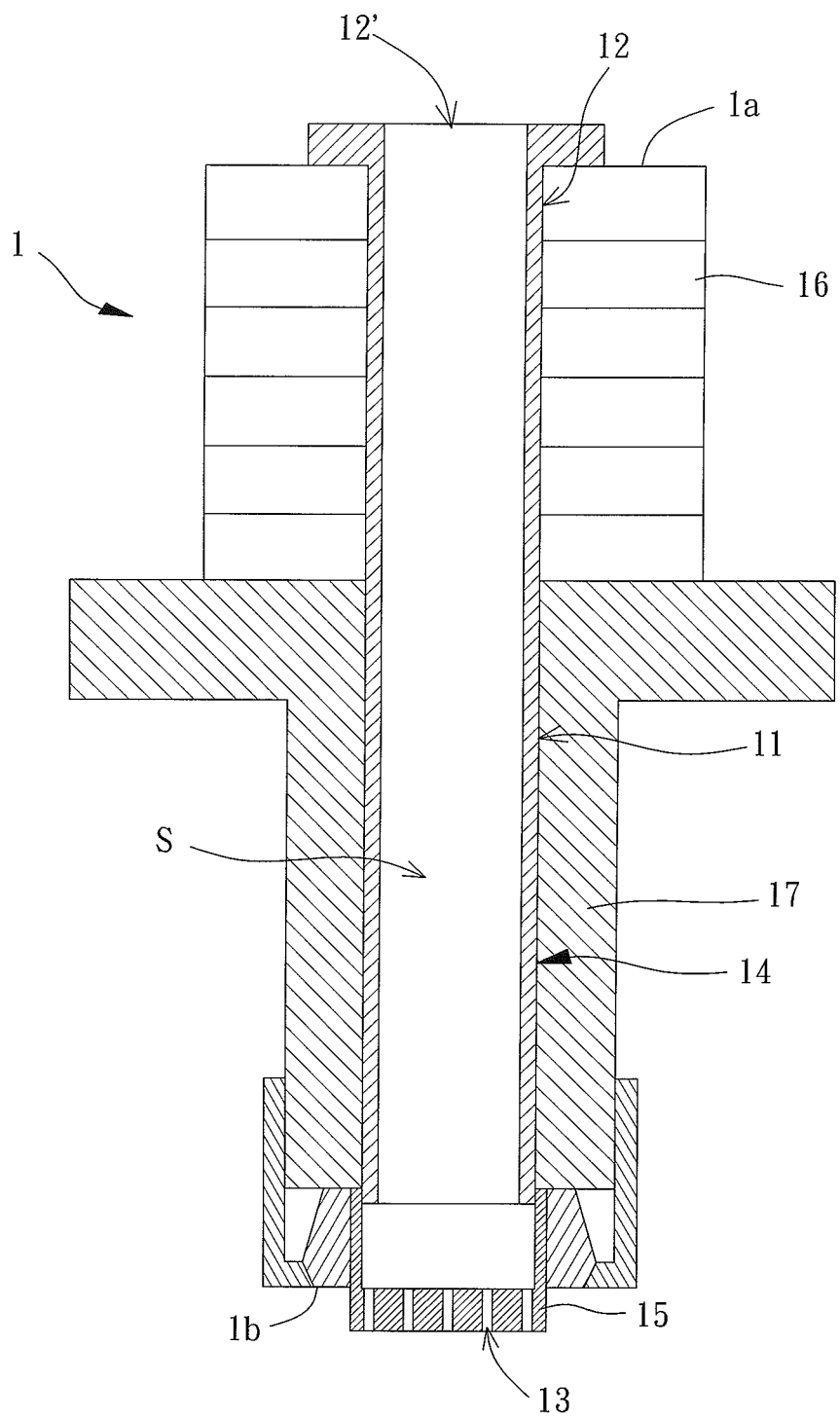
FIG. 3 is a cross sectional view of the nozzle of FIG. 2.

With reference to FIGS. 2 and 3, a nozzle for producing microparticles of an embodiment according to the present disclosure includes a nozzle body 1 having a first end 1a and a second end 1b opposite to the first end 1a. The nozzle body 1 further includes a through-hole 11 extending from the first end 1a through the second end 1b. A fluid passageway S is defined in the through-hole 11 and forms a filling port 12 in the first end 1a and a plurality of outlet ports 13 in the second end 1b. In this embodiment, the outlet ports 13 are formed in a sleeve 15. A worker can fill an oil phase fluid F1 (see FIG. 5) into the filling port 12. The oil phase fluid F1 flows through the fluid passageway S and forms a liquid film on each outlet port 13 by surface tension.

Figure 4:
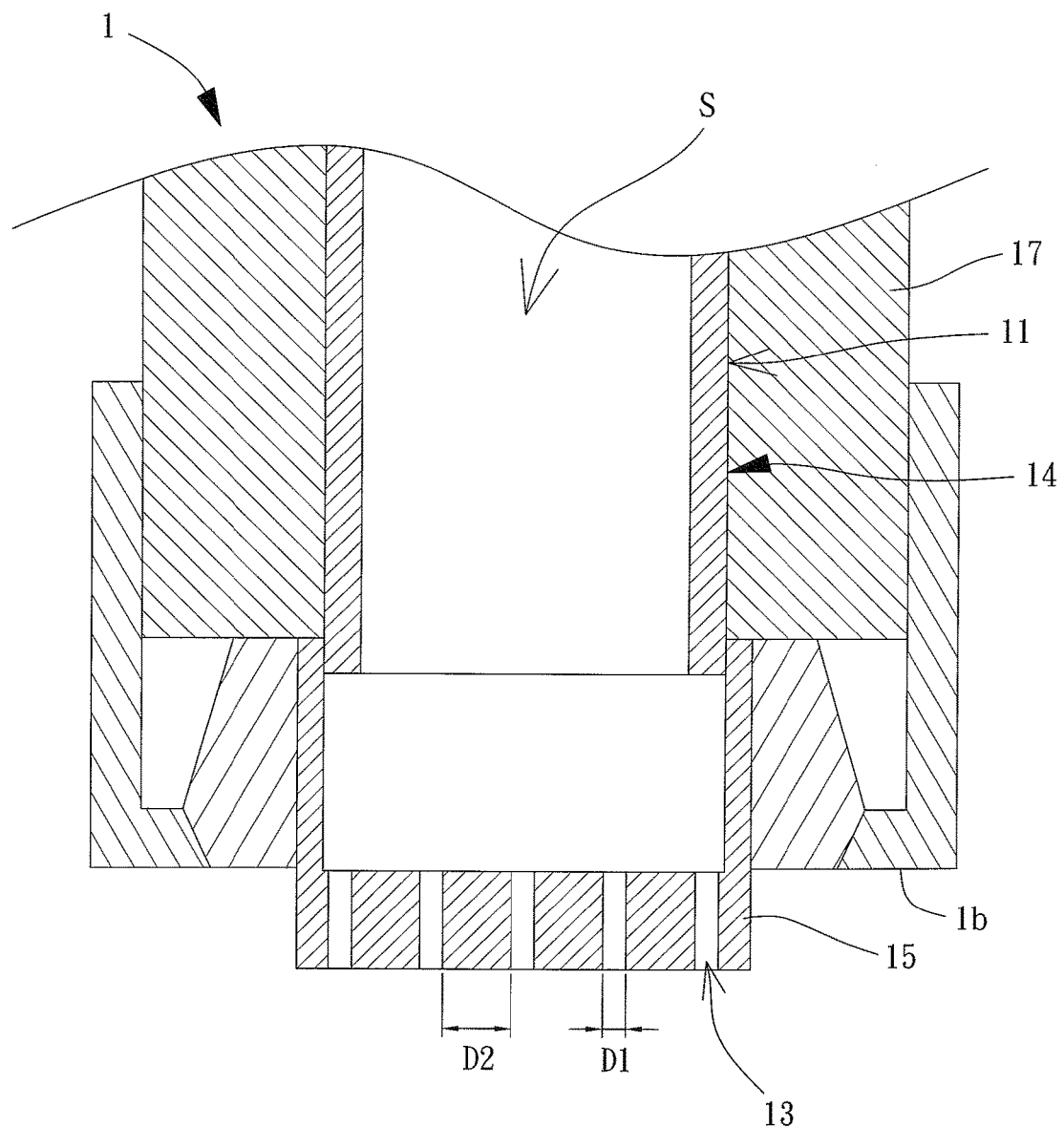
FIG. 4 is an enlarged view of a portion of FIG. 3.

With reference to FIG. 4, each outlet port 13 has a diameter D1. Two adjacent outlet ports 13 have a wall spacing D2 therebetween. The wall spacing D2 is preferably at least two times the diameter D1. Thus, the liquid films can more easily absorb the amplitude energy to generate a standing wave phenomenon.

With reference to FIGS. 2 and 3, in this embodiment, the nozzle body 1 further includes a tube 14 mounted in the through-hole 11. The filling port 12' is formed in an end of the tube 14. The sleeve 15 is mounted to the other end of the tube 14 and includes the outlet ports 13. The tube 14 includes an interior forming the fluid passageway S. The outer diameter of the tube 14 matches the inner diameter of the sleeve 15 to prevent leakage of liquid from between the walls of the tube 14 and the sleeve 15. Thus, the worker can replace the tube 14 according to a need (such as replacement of the oil phase fluid F1) or replace the sleeve 15 according to another need (such as replacement of the oil phase fluid F1 and/or blockage in the outlet ports 13 of the sleeve 15) without replacing the whole nozzle body 1, thereby reducing the purchasing costs of the nozzle. The inner diameter of the fluid passageway S can be determined by the flow and pressure of the liquid filled into the filling port 12'. A smaller diameter makes the pressure change of the liquid more sensitive, obtaining a better micro flow control effect.

The nozzle body 1 further includes an oscillating device and an amplifying portion 17. The amplifying portion 17 surrounds the fluid passageway S and is located adjacent to the second end 1b of the nozzle body 1. The oscillating device can be directly or indirectly connected to the amplifying portion 17. In this embodiment, the oscillating device includes a piezoelectric portion 16. When the piezoelectric portion 16 receives high frequency electric energy from a supersonic wave generator G (see FIG. 5), the high frequency electric energy is turned into vibrational energy which is transmitted to the amplifying portion 17, such that the second end 1b of the nozzle body 1 can have the maximum vibrational amplitude and forms a standing wave. Thus, the liquid film on each outlet port 13 can absorb the vibrational energy to reduce the thickness of the liquid film. As a result, the liquid film can exit the outlet port 13 in the form of a uniform and tiny spray, which will be described in detail hereinafter. For the sake of explanation, the oil phase fluid F1 exiting the outlet ports 13 in the form of a spray is hereinafter referred to as a "microdroplet".

The diameter $d_p$ of the microdroplet can be expressed by the equation presented by Robert J. Lang in 1962.

$$d_p = 0.34 \cdot \lambda$$

$$\lambda = (8 \cdot \pi \cdot \theta / (\rho \cdot f^2))^{1/3}$$

wherein $\lambda$ is the wavelength of the standing wave, $\theta$ is the surface tension of the oil phase fluid, $\rho$ is the density of the oil phase fluid, and f is the vibrational frequency. As can be seen from the above equation, a smaller diameter of the microdroplet can be obtained by simply increasing the vibrational frequency.

Figure 5:
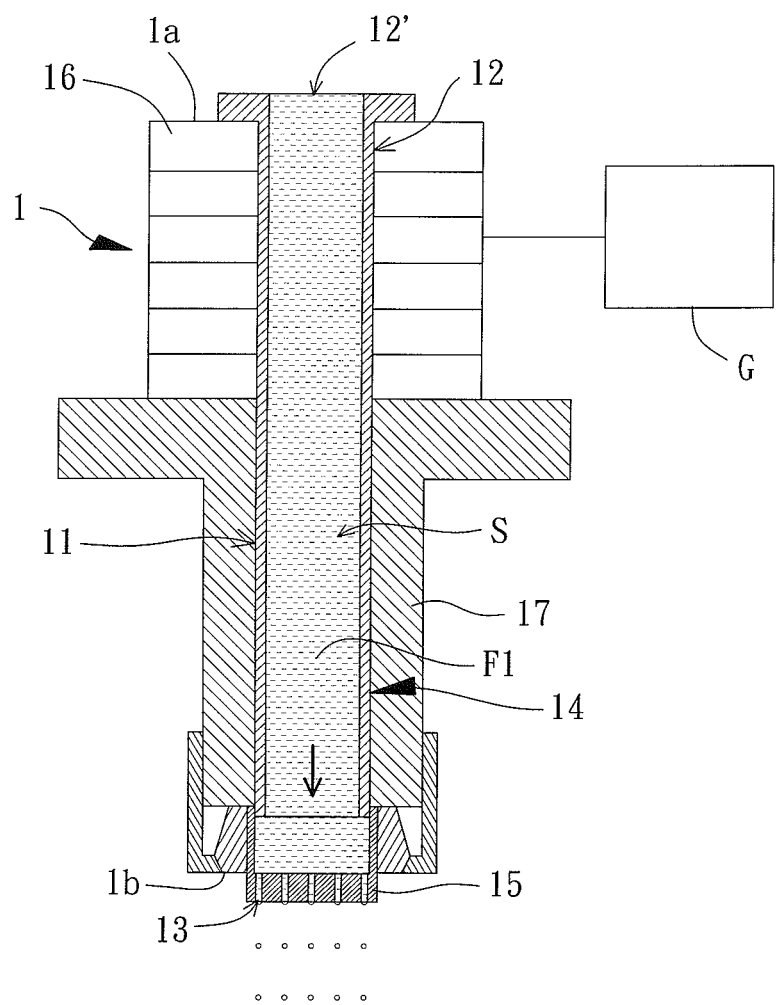
FIG. 5 is a diagrammatic view illustrating use of the nozzle of FIG. 2.
Figure 5:
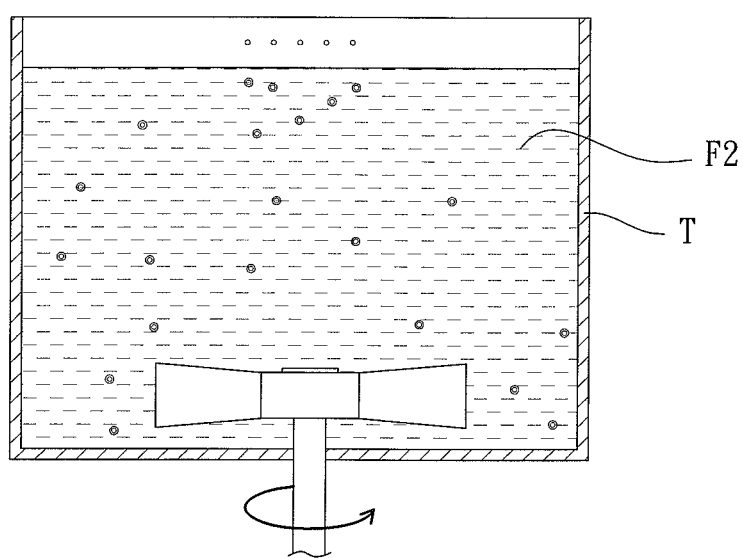

With reference to FIG. 5, in practical use of the nozzle for producing microparticles according to the present disclosure, a worker fills a water phase fluid F2 into a tank T, and the outlet ports 13 of the nozzle body 1 face the tank T, thereby completing installation of the nozzle.

Then, the worker fills the oil phase fluid F1 into the fluid passageway S via the filling ports 12, 12', and the oil phase fluid F1 forms a liquid film on each outlet port 13 by its surface tension. Next, the worker activates the supersonic wave generator G, and the high frequency electric energy generated by the supersonic wave generator G is transmitted to the piezoelectric portion 16 and is turned into vibrational energy by the piezoelectric portion 16. Furthermore, the amplifying portion 17 connected to the piezoelectric portion 16 transmits the vibrational energy and increases the amplitude, such that the liquid film on each outlet port 13 can absorb the vibrational energy. When the vibrational energy exceeds the surface tension, the liquid films form microdroplets that fall into the tank T.

Figure 6:
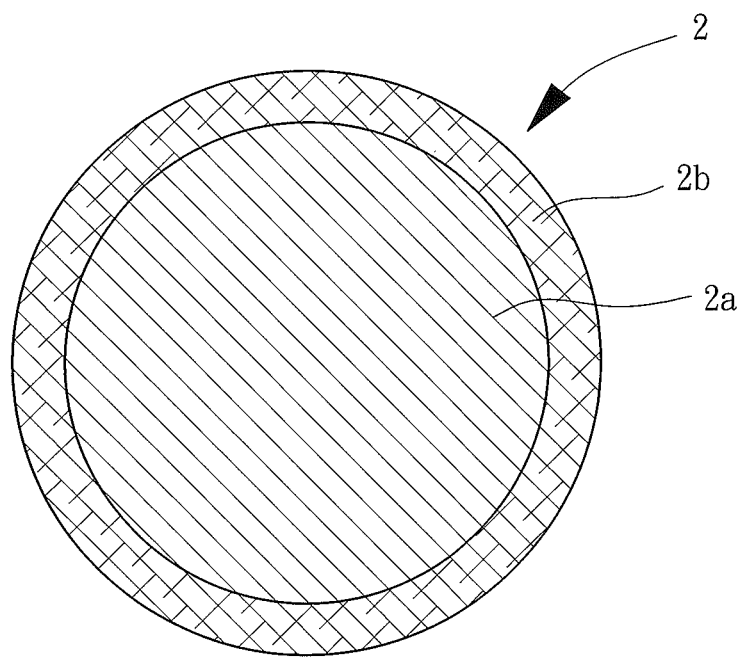
FIG. 6 is a diagrammatic view of a semi-product of a microparticle produced by the nozzle of FIG. 2.

At this time, the water phase fluid F2 in the tank T envelops the surface of each microdroplet to form a semi-product 2 (see FIG. 6) in the tank T. The semi-product 2 includes an inner layer 2a formed by the oil phase fluid F1 and an outer layer 2b formed by the water phase fluid F2.

Figure 7:
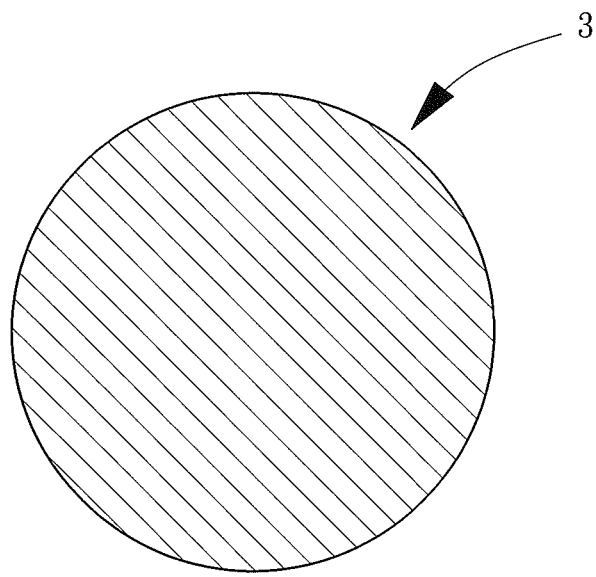
FIG. 7 is a diagrammatic view of a microparticle product produced from the semi-product of FIG. 6.

Next, the worker collects the semi-products 2 in the tank T. The semi-products 2 can be dried by hot air to evaporate the outer layer 2b formed by the water phase fluid F2, forming microparticle products 3 each of which is merely formed by the oil phase fluid F1 (see FIG. 7).

In view of the foregoing, the nozzle for producing microparticles according to the present disclosure utilizes the combined action of the piezoelectric portion 16 and the amplifying portion 17 to reduce the thickness of the liquid film on each outlet port 3, thereby forming microdroplets that fall into the tank T. Thus, the present disclosure achieves the effect of mass production of uniform microscale or nanoscale microparticles.

Thus since the present disclosure disclosed herein may be embodied in other specific forms without departing from the spirit or general characteristics thereof, some of which forms have been indicated, the embodiments described herein are to be considered in all respects illustrative and not restrictive. The scope of the present disclosure is to be indicated by the appended claims, rather than by the foregoing description, and all changes which come within the meaning and range of equivalency of the claims are intended to be embraced therein.

What is claimed is:

1. A nozzle for producing microparticles, comprising:
a nozzle body including a first end and a second end opposite to the first end, with the nozzle body further including a through-hole extending from the first end through the second end, with a fluid passageway defined in the through-hole and forming a filling port in the first end of the nozzle body and a plurality of outlet ports in the second end of the nozzle body, with the nozzle body further including an oscillating device and an amplifying portion, with the oscillating device connected to the amplifying portion, with the amplifying portion surrounding the fluid passageway and located adjacent to the second end of the nozzle body, with the nozzle body including a tube mounted in the through-hole, with the filling port formed in a end of the tube, with a sleeve mounted to another end of the tube and including the plurality of outlet ports, and with the tube including an interior forming the fluid passageway.

2. The nozzle for producing microparticles as claimed in claim 1, with each of the plurality of outlet ports having a diameter, with two adjacent outlet ports having a wall spacing therebetween, and with the wall spacing being at least two times the diameter.

3. The nozzle for producing microparticles as claimed in claim 1, wherein the oscillating device includes a piezoelectric portion.

4. The nozzle for producing microparticles as claimed in claim 1, wherein an outer diameter of the tube matches an inner diameter of the sleeve.

5. The nozzle for producing microparticles as claimed in claim 1, wherein the amplifying portion concentrically surrounds the fluid passageway and is spaced from the plurality of outlet ports.

\* \* \* \* \*